(12) United States Patent
Nishibu

(10) Patent No.: US 10,018,302 B2
(45) Date of Patent: Jul. 10, 2018

(54) HIGH PRESSURE TANK AND MANUFACTURING METHOD OF HIGH PRESSURE TANK

(71) Applicant: TOYOTA JIDOSHA KABUSHIKI KAISHA, Toyota-shi (JP)

(72) Inventor: Shiro Nishibu, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/325,611

(22) Filed: Jul. 8, 2014

(65) Prior Publication Data

US 2015/0014332 A1    Jan. 15, 2015

(30) Foreign Application Priority Data

Jul. 10, 2013   (JP) ................. 2013-144217

(51) Int. Cl.
  *F17C 1/02*   (2006.01)
  *F17C 1/04*   (2006.01)
  *F17C 1/16*   (2006.01)

(52) U.S. Cl.
  CPC ............... *F17C 1/02* (2013.01); *F17C 1/04* (2013.01); *F17C 1/16* (2013.01); *F17C 2201/0109* (2013.01); *F17C 2201/056* (2013.01); *F17C 2203/0604* (2013.01); *F17C 2203/066* (2013.01); *F17C 2203/0621* (2013.01); *F17C 2203/0636* (2013.01); *F17C 2203/0663* (2013.01); *F17C 2205/0305* (2013.01); *F17C 2221/012* (2013.01); *F17C 2223/0123* (2013.01); *F17C 2223/036* (2013.01); *F17C 2270/0168* (2013.01); *F17C 2270/0184* (2013.01); *Y02E 60/321* (2013.01)

(58) Field of Classification Search
  CPC ............... F17C 1/005; F17C 1/12; F17C 1/16
  USPC .............................. 220/581, 586, 590
  See application file for complete search history.

(56) References Cited

U.S. PATENT DOCUMENTS

| | | | | |
|---|---|---|---|---|
| 2,471,663 | A | * | 5/1949 | Tietz ........................... 228/155 |
| 3,266,660 | A | | 8/1966 | Ragettli |
| 3,815,773 | A | | 6/1974 | Duvall et al. |
| 5,429,845 | A | | 7/1995 | Newhouse et al. |
| 6,759,003 | B1 | * | 7/2004 | Obara et al. ................. 264/529 |
| 7,389,890 | B1 | * | 6/2008 | Hampsten ................. F17C 1/16 220/560.07 |
| 7,556,171 | B2 | * | 7/2009 | Ishimaru ..................... 220/586 |
| 7,810,670 | B2 | * | 10/2010 | Carter et al. .................. 220/565 |
| 8,727,174 | B2 | * | 5/2014 | Otsubo ......................... 220/589 |
| 2004/0118855 | A1 | * | 6/2004 | Calabro ................... 220/560.08 |
| 2004/0182869 | A1 | * | 9/2004 | Kubo et al. .................. 220/581 |

(Continued)

FOREIGN PATENT DOCUMENTS

DE   2223852 A1   1/1973
DE   69206114 T2   4/1996

(Continued)

*Primary Examiner* — Andrew T Kirsch
*Assistant Examiner* — Don M Anderson
(74) *Attorney, Agent, or Firm* — Hunton Andrews Kurth LLP

(57) ABSTRACT

A high pressure tank has a liner and a reinforcing layer. The reinforcing layer is formed on an outer surface of the liner. An adhesion inhibiting process that inhibits the liner from adhering to the reinforcing layer is applied to at least a portion of the liner in a region contacting the reinforcing layer.

4 Claims, 4 Drawing Sheets

(56) References Cited

U.S. PATENT DOCUMENTS

| | | | |
|---|---|---|---|
| 2006/0054628 A1* | 3/2006 | Matsuoka et al. | 220/581 |
| 2008/0142523 A1* | 6/2008 | Sakaguchi et al. | 220/500 |
| 2009/0266823 A1* | 10/2009 | Mazabraud et al. | 220/581 |
| 2010/0075200 A1 | 3/2010 | Hatta | |
| 2012/0048862 A1* | 3/2012 | Otsuka et al. | 220/495.01 |
| 2012/0138616 A1 | 6/2012 | Lindner et al. | |
| 2013/0087567 A1* | 4/2013 | Kaneko | F17C 1/06 220/590 |
| 2013/0186893 A1 | 7/2013 | Claudel | |
| 2014/0014667 A1* | 1/2014 | Flammer | 220/590 |
| 2014/0099458 A1* | 4/2014 | Tyler et al. | 428/35.8 |

FOREIGN PATENT DOCUMENTS

| | | |
|---|---|---|
| DE | 102009042401 A1 | 5/2010 |
| JP | 10-292899 A | 11/1998 |
| JP | 2008-144943 A | 6/2008 |
| JP | 2008-164131 A | 7/2008 |
| JP | 2009-216133 A | 9/2009 |
| JP | 2011-220425 A | 11/2011 |
| WO | 2008/072046 A1 | 6/2008 |

* cited by examiner

HIGH PRESSURE TANK AND MANUFACTURING METHOD OF HIGH PRESSURE TANK

INCORPORATION BY REFERENCE

The disclosure of Japanese Patent Application No. 2013-144217 filed on Jul. 10, 2013 including the specification, drawings and abstract is incorporated herein by reference in its entirety.

BACKGROUND OF THE INVENTION

1. Field of the Invention

The invention relates to a high pressure tank and a manufacturing method of a high pressure tank.

2. Description of Related Art

A variety of high pressure tank structures have been developed (Japanese Patent Application Publication No. 2008-164131 (JP 2008-164131 A), for example). JP 2008-164131 A describes technology that involves forming an adhesive layer between a liner and a fiber-reinforced plastic layer in order to increase an airtight sealing property.

With the high pressure tank described in JP 2008-164131 A, the liner is adhered to the fiber-reinforced plastic layer by an adhesive. Therefore, when the flexibility of the liner decreases at low temperatures, for example, stress from the internal pressure of the tank may concentrate at a localized part of the liner, and the liner may warp.

Also, when the high pressure tank is to be filled with hydrogen gas used in a fuel cell vehicle, hydrogen is continuously released from the high pressure tank at a high rate of flow when the fuel cell vehicle travels at high speeds. At this time, the temperature inside the high pressure tank rapidly drops to a low temperature as a result of the hydrogen inside the high pressure tank adiabatically expanding. For example, in a cold region where the outside air temperature is −10° C., the temperature inside the high pressure tank will drop to an extremely low temperature of approximately −70° C. At this extremely low temperature, breaking elongation of the liner decreases, so with a high pressure tank having a structure in which a liner is adhered to a fiber-reinforced plastic layer by an adhesive, high stress may be applied to a localized part of the liner.

SUMMARY OF THE INVENTION

A first aspect of the invention relates to a high pressure tank that includes a liner and a reinforcing layer. The reinforcing layer is formed on an outer surface of the liner. The liner includes a processed portion to which an adhesion inhibiting process that inhibits the liner from adhering to the reinforcing layer is applied. The processed portion is provided in a region contacting the reinforcing layer. With the high pressure tank according to this first aspect of the invention, the liner includes the processed portion to which the adhesion inhibiting process that inhibits the liner from adhering to the reinforcing layer is applied. Therefore, stress received by the liner from the internal pressure of the high pressure tank is able to be dispersed, so stress is able to be inhibited from concentrating at a localized part of the liner.

In the high pressure tank according the first aspect of the invention, the adhesion inhibiting process may be a process that involves forming a mold release agent layer that is formed by a mold release agent, on at least a portion between the liner and the reinforcing layer. Because the mold release agent layer is formed on at least a portion between the liner and the reinforcing layer in the high pressure tank of this aspect, the mold release agent layer inhibits the liner from adhering to the reinforcing layer. Therefore, stress received by the liner from the internal pressure of the high pressure tank is able to be dispersed, so stress is able to be inhibited from concentrating at a localized part of the liner.

In the high pressure tank according to the first aspect of the invention, the processed portion may be provided on a dome portion which the liner includes, the dome portion having a curved surface shape. With the high pressure tank according to this aspect, the processed portion is provided on the dome portion of the liner where stress from the internal pressure of the tank tends to concentrate. Therefore, stress that is applied to the dome portion of the liner is able to be dispersed.

In the high pressure tank according to the first aspect of the invention, the liner may be made of resin. With the high pressure tank of this aspect, the liner is made of resin. With the resin liner, breaking elongation at a low temperature decreases, so there is a particular tendency for stress from internal pressure of the tank to concentrate at a localized part of the liner. Therefore, dispersing stress by applying the adhesion inhibiting process to the liner is particularly effective with a high pressure tank to which a resin liner is applied.

The high pressure tank according to the first aspect of the invention may be a high pressure hydrogen tank that is configured to be filled with hydrogen. When hydrogen is continuously released from the high pressure tank at a high rate of flow, the temperature inside the high pressure tank rapidly drops to a low temperature as a result of the hydrogen inside the high pressure tank adiabatically expanding. Consequently, breaking elongation of the liner decreases, so high stress is applied to the liner. Therefore, dispersing stress by applying the adhesion inhibiting process to the liner is particularly effective with a high pressure hydrogen tank.

A second aspect of the invention relates to a manufacturing method of a high pressure tank. This manufacturing method includes forming a reinforcing layer on an outer surface of a liner; and performing an adhesion inhibiting treatment that inhibits adhesion of the liner to the reinforcing layer, on at least a portion of a region where the liner contacts the reinforcing layer, before forming the reinforcing layer. With the manufacturing method of a high pressure tank according to the second aspect of the invention, the adhesion inhibiting treatment that inhibits adhesion of the liner to the reinforcing layer is performed on at least a portion of the region where the liner contacts the reinforcing layer. Therefore, in a high pressure tank after manufacture, stress received by the liner from the internal pressure of the high pressure tank is able to be dispersed, so stress can be inhibited from concentrating at a localized part of the liner.

According to the first and second aspects of the invention, at least one of cost reduction, resource saving, simplified manufacturing, and improved performance and the like is able to be achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
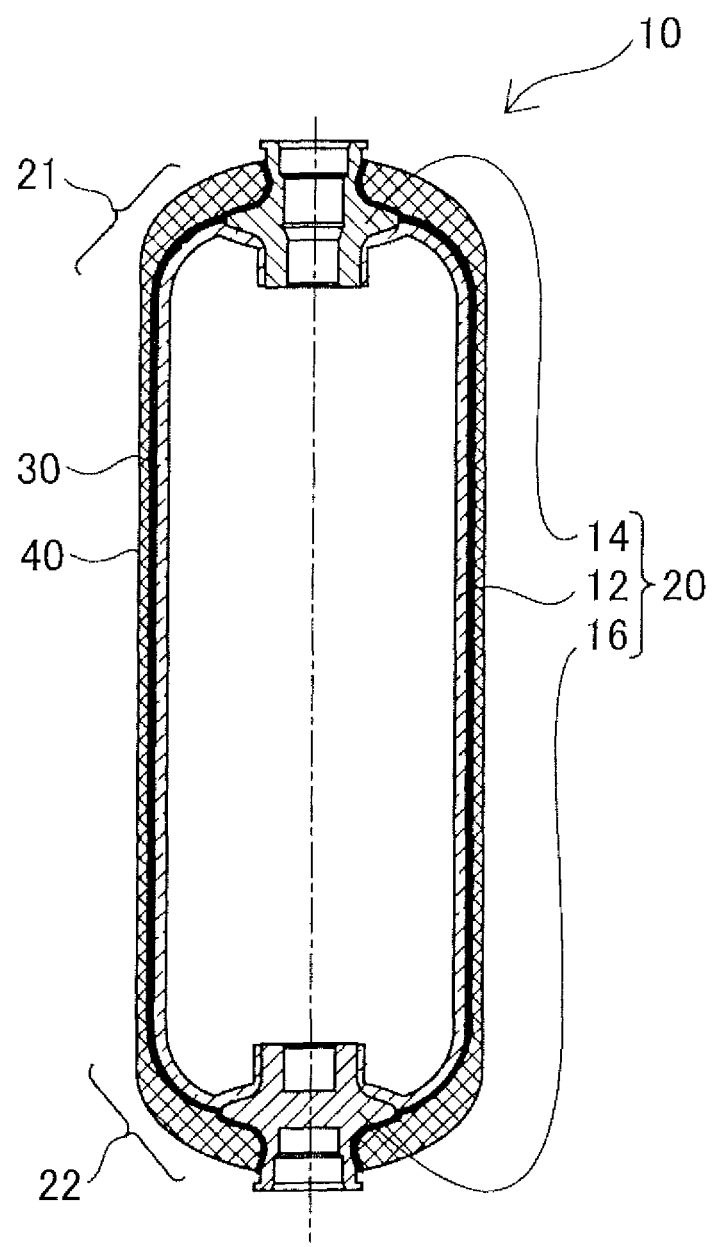
FIG. 1 is an explanatory view of the structure of a high pressure tank according to a first example embodiment of the invention.

Hereinafter, a first example embodiment of the invention will be described. FIG. 1 is an explanatory view of the structure of a high pressure tank 10 as the first example embodiment of the invention. The high pressure tank 10 is used to store hydrogen as a fuel gas used in an onboard fuel cell system, for example.

As shown in the drawing, the high pressure tank 10 includes a liner 12, caps 14 and 16, a mold release agent layer 30, and a fiber-reinforced plastic layer 40. The caps 14 and 16 are provided at each end of the liner 12 in the length direction. The liner 12 and the caps 14 and 16 together form a main body portion 20.

The liner 12 is made of resin having a gas barrier property with respect to hydrogen gas, such as a nylon resin, for example, that is molded. The liner 12 has a curved surface portion near both ends in the length direction. Hereinafter, these curved surface portions of the liner 12 will also be referred to as dome portions 21 and 22. In this example embodiment, the liner 12 is made of resin, but it may also be made of metal.

The fiber-reinforced plastic layer 40 is formed on an outer surface of the main body portion 20. The fiber-reinforced plastic layer 40 is formed by winding fiber impregnated with a thermosetting resin in advance, according to a filament winding method (hereinafter, also referred to as "FW method").

The mold release agent layer 30 is formed by a mold release agent. The mold release agent layer 30 is formed over the entire region between the main body portion 20 and the fiber-reinforced plastic layer 40. The mold release agent layer 30 inhibits the main body portion 20 from adhering to the fiber-reinforced plastic layer 40. In this example embodiment, a fluorine mold release agent is used as the mold release agent. Alternatively, a silicon mold release agent may also be used as the mold release agent. The high pressure tank 10 is formed in this way.

Figure 2:
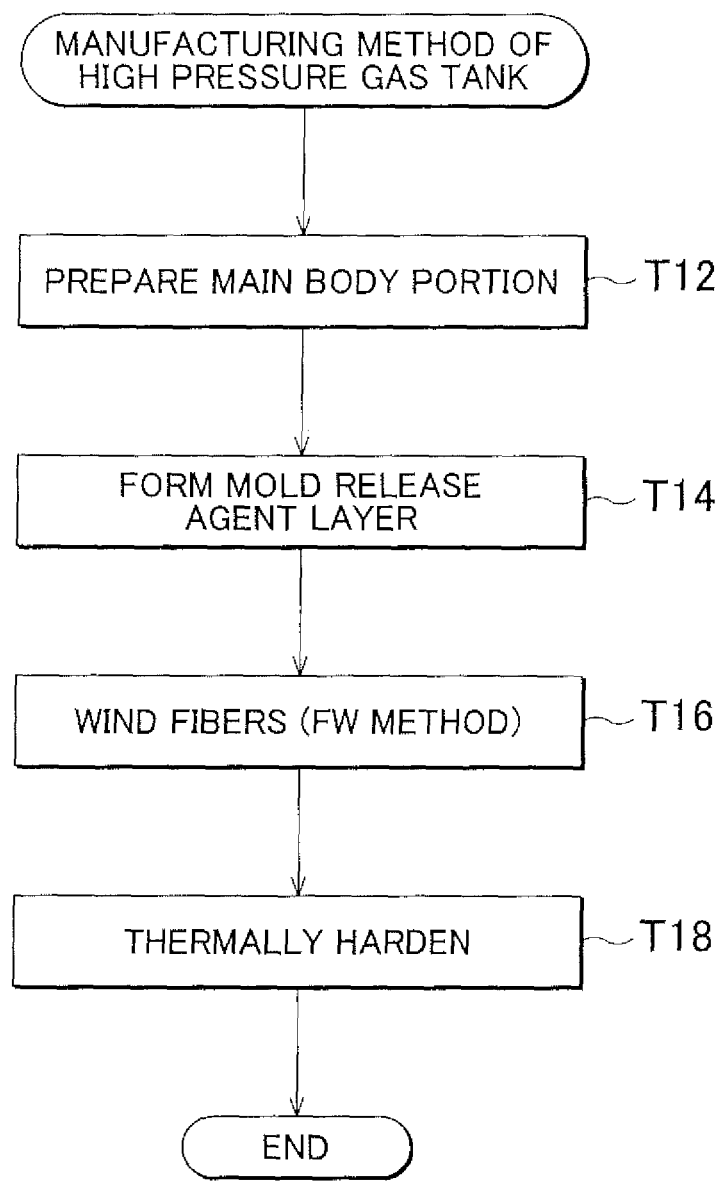
FIG. 2 is a process chart illustrating a manufacturing method of the high pressure tank according to the first example embodiment.

FIG. 2 is a process chart illustrating a manufacturing method of the high pressure tank 10. First, the main body portion 20 is prepared (step T12). That is, the liner 12 with the caps 14 and 16 attached is prepared. In this example embodiment, a resin liner is used as the liner 12, as described above.

Then, the mold release agent layer 30 is formed by applying a fluorine mold release agent to the main body portion 20, and drying it (step T14). More specifically, in the next step, a fluorine mold release agent is applied by spraying, to the entire region of the main body portion 20 where the fiber-reinforced plastic layer 40 is formed. The applied fluorine mold release agent is then dried with warm air, thus forming the mold release agent layer 30. Application of the mold release agent is not limited to spraying. For example, the mold release agent may also be applied with a brush, or the liner 12 may be dipped in a container containing the mold release agent, for example. Alternatively, the mold release agent layer 30 may be formed by putting a film made of the mold release agent on the outer surface of the liner 12.

After the mold release agent is applied and dried, the fibers that have been impregnated with the thermosetting rein are wound around main body portion 20 according to the FW method (step T16). In this example embodiment, epoxy resin is used as the thermosetting resin. Also, carbon fiber is used as the wound fiber. The wound fiber may also be glass fiber or aramid fiber or the like. The fiber may be wound by hoop winding, or low angle, high angle helical winding, or the like.

Then the epoxy resin with which the carbon fiber is impregnated is thermally hardened (step T18). More specifically, the main body portion 20 around which the carbon fiber impregnated with epoxy resin is wound is heated by a heating furnace to thermally harden the epoxy resin, thus forming the fiber-reinforced plastic layer 40. The high pressure tank 10 is manufactured by the steps described above.

Figure 3:
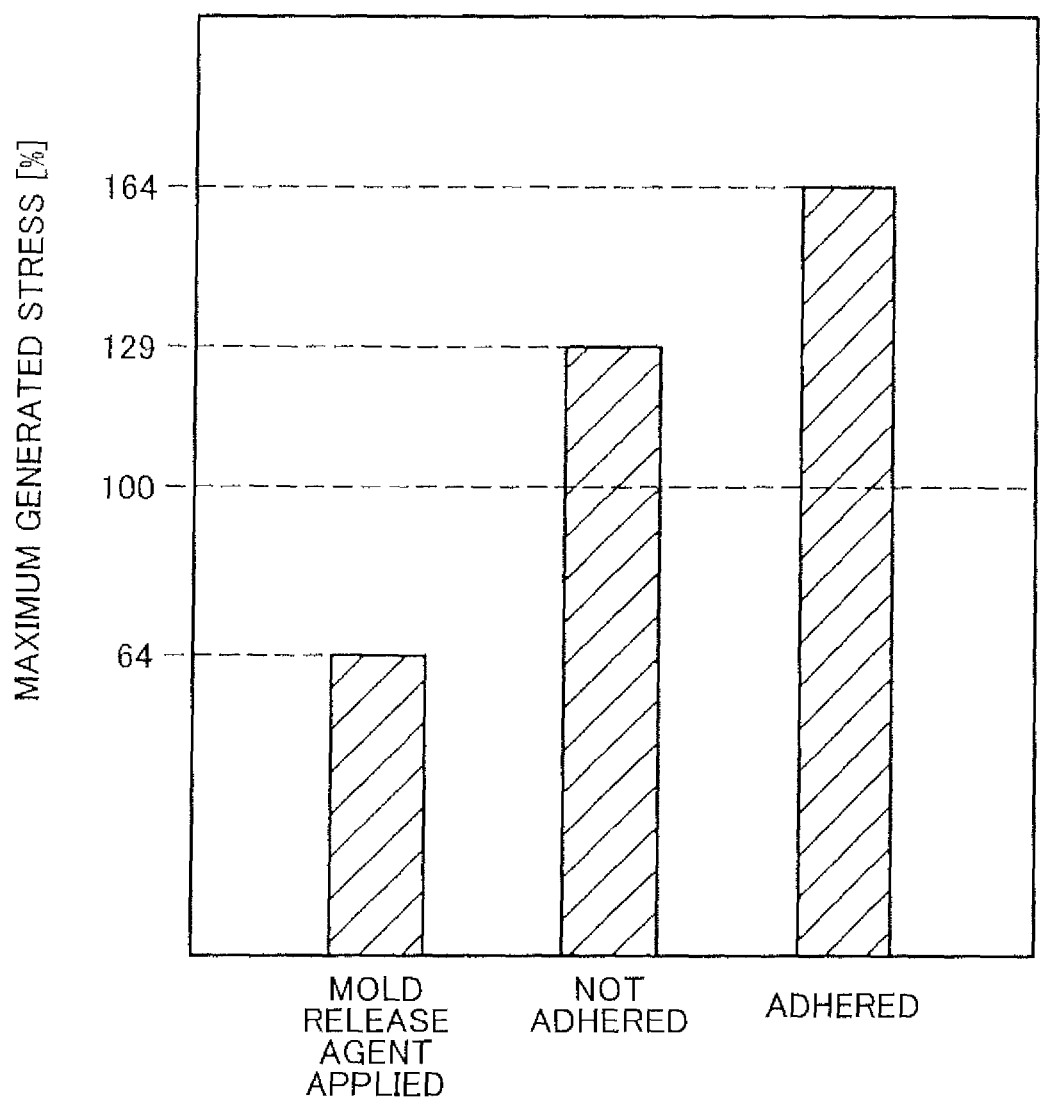
FIG. 3 is an explanatory view of the effects of the first example embodiment.

FIG. 3 is an explanatory view of the effects of the high pressure tank 10 manufactured in the first example embodiment. The graph shown in FIG. 3 shows the results obtained by dividing the states between the main body portion 20 and the fiber-reinforced plastic layer 40 into three patterns, i.e., "mold release agent applied", "not adhered", and "adhered", and calculating the maximum generated stress applied to the liner in each state according to a simulation by Computer-Aided Engineering (CAE). When the simulation by CAE was performed, the material quality of the fiber-reinforced plastic, the material quality of the liner, the material quality of the caps, the shape of each member, and the filling pressure of the hydrogen gas and the like were used as parameters. Also, on the vertical axis in the graph, the stress allowed for the liner (hereinafter, also referred to as the "allowable stress") is shown as a reference (100%).

The bar labeled "adhered" in the graph in FIG. 3 shows the result obtained by filling hydrogen gas of a predetermined pressure into a high pressure tank in which the main body portion 20 is adhered to the fiber-reinforced plastic layer 40 without the mold release agent layer 30 being provided therebetween, and calculating the maximum generated stress applied to the liner, by CAE. In the case of "adhered", the calculation result shows that the maximum generated stress applied to the liner is 164% of the allowable stress.

Figure 4:
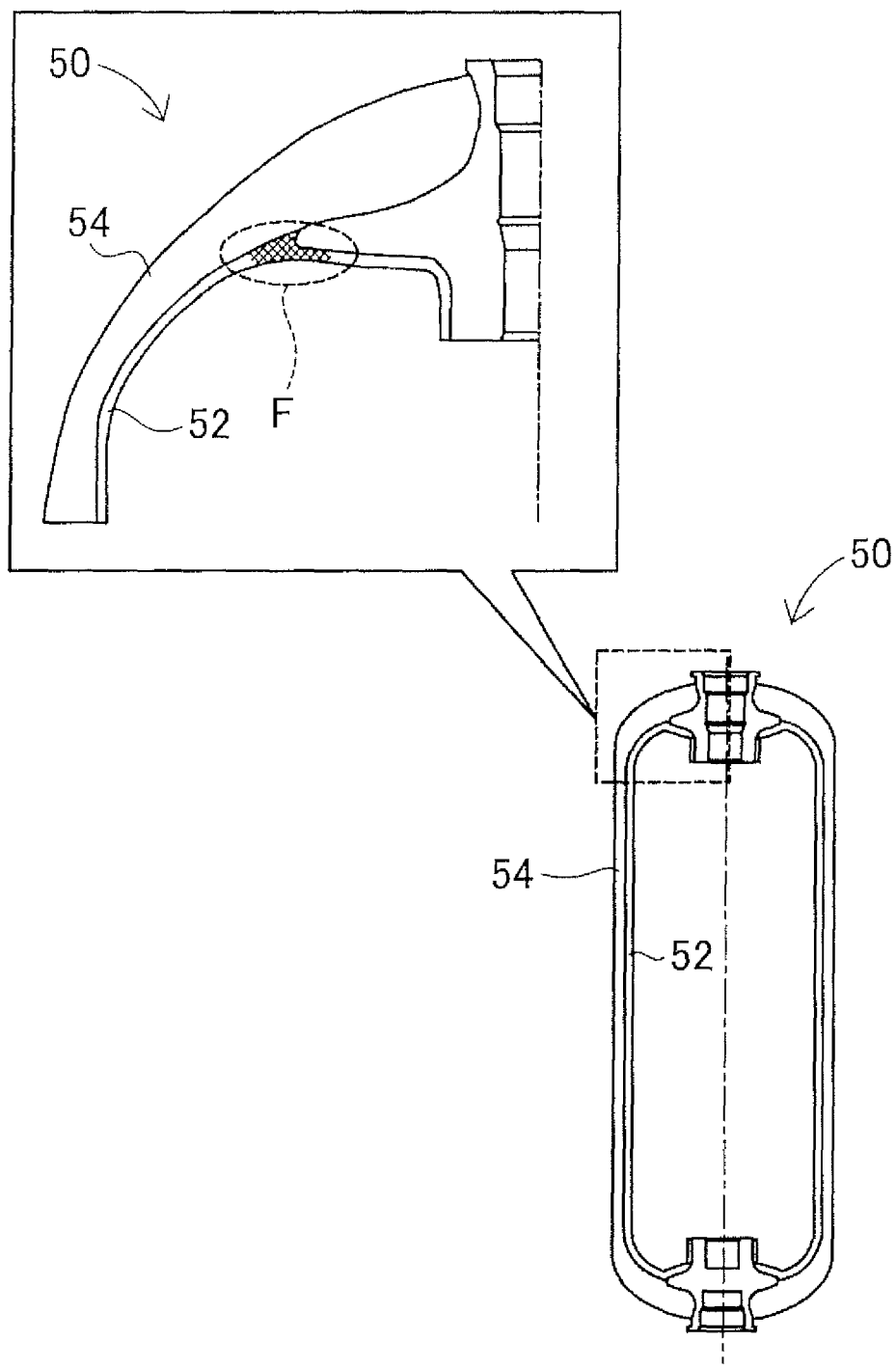
FIG. 4 is a stress distribution chart of a high pressure tank of a comparative example in which a liner is adhered to a fiber-reinforced plastic layer.

FIG. 4 is an explanatory view of the distribution of stress applied to the liner 52 when hydrogen gas of 70 Mpa is filled into a high pressure tank 50 of a comparative example having a structure in which a liner 52 is adhered to a fiber-reinforced plastic layer 54, based on a simulation by CAE. The result of the simulation by CAE indicates that stress locally concentrates in a region F (see FIG. 4) of the liner 52. As shown by the graph in FIG. 3, the calculation result shows that the stress applied locally to the liner 52 is approximately 164% of the allowable stress.

The bar labeled "not adhered" in the graph in FIG. 3 shows the result obtained by calculating the maximum generated stress applied to the liner, when a high pressure tank in which the mold release agent layer 30 is not provided between the main body portion 20 and the fiber-reinforced plastic layer 40, and the main body portion 20 is not adhered to the fiber-reinforced plastic layer 40, is supposed by the simulation, and hydrogen gas of a predetermined pressure has been filled into the high pressure tank. With this high pressure tank, the main body portion 20 is not adhered to the fiber-reinforced plastic layer 40, so friction force acts between the main body portion 20 and the fiber-reinforced plastic layer 40. In the case of "not adhered", the calculation result shows that the maximum generated stress applied to the liner is 129% of the allowable stress.

The bar labeled "mold release agent applied" in the graph in FIG. 3 shows the result obtained by calculating, using CAE, the maximum generated stress applied to the liner when hydrogen gas of a predetermined pressure has been filled into a high pressure tank provided with the mold release agent layer 30 between the main body portion 20 and the fiber-reinforced plastic layer 40. With the high pressure tank having the mold release agent layer 30, the main body portion 20 is inhibited from adhering to the fiber-reinforced plastic layer 40. Also, the mold release agent includes a lubricant component, so lubricity is imparted between the main body portion 20 and the fiber-reinforced plastic layer 40. In the case of "mold release agent applied", the calculation result shows that the maximum generated stress applied to the liner is 64% of the allowable stress.

As described above, the high pressure tank 10 in this example embodiment includes the mold release agent layer 30 between the main body portion 20 and the fiber-reinforced plastic layer 40, so the main body portion 20 is inhibited from adhering to the fiber-reinforced plastic layer 40. Therefore, the liner 12 is able to disperse the stress received by the internal pressure of the high pressure tank 10, and is thus able to inhibit the concentration of localized stress. As a result, the high pressure tank 10 having the mold release agent layer 30 ("mold release agent applied") is able to significantly reduce the maximum generated stress applied to the liner 12 compared to the high pressure tank of the related art in which the main body portion 20 is adhered to the fiber-reinforced plastic layer 40 ("adhered"), as shown by the calculation results according to CAE (FIG. 3).

The invention is not limited to the example embodiment described above, but may be carried out in any one of a variety of modes without departing from the scope thereof. Hereinafter, a first modified example will be described. In the foregoing example embodiment, in order to apply the adhesion inhibiting process to the liner 12, the mold release agent layer 30 is formed between the main body portion 20 and the fiber-reinforced plastic layer 40, such that stress applied to the liner 12 is dispersed. Alternatively, friction force between the liner and the fiber-reinforced plastic layer may be reduced by reducing the surface roughness of a contact surface of the liner that contacts the fiber-reinforced plastic layer, for example, as another adhesion inhibiting process. The surface roughness may be reduced by applying specular finishing to the outer surface of the liner, for example. Furthermore, when forming the fiber-reinforced plastic layer, resin with a low fixing strength with respect to the liner surface may be selected as the resin material with which the wound fiber is impregnated, and the fiber may be impregnated with this resin. In this case as well, an effect similar to that obtained in the example embodiment described above is able to be obtained.

Next, a second modified example will be described. In the example embodiment described above, the mold release agent layer 30 is formed over the entire region between the main body portion 20 and the fiber-reinforced plastic layer 40, but the mold release agent layer 30 may also be formed on only part of the region between the main body portion 20 and the fiber-reinforced plastic layer 40. In this case as well, stress applied to the liner is able to be dispersed, so the maximum generated stress is able to be reduced compared with a liner in which the main body portion 20 is adhered to the fiber-reinforced plastic layer 40 over the entire region thereof. Also, as described with reference to FIG. 4, it was found that there is a tendency for stress to locally concentrate near the dome portions 21 and 22 of the liner 12. Therefore, it is possible to inhibit the concentration of stress applied to the liner 12, by forming the mold release agent layer 30 on at least the dome portions 21 and 22 of the liner 12.

Next, a third modified example will be described. In the example embodiment described above, a fiber-reinforced plastic layer is used as the reinforcing layer, but the reinforcing layer is not limited to this. That is, the reinforcing layer may be made of any of a variety of materials. For example, the reinforcing layer may be made of only thermosetting resin. This is able to be realized by forming the mold release agent layer 30 on the main body portion 20, and then applying and thermally hardening the thermosetting resin, thus forming a thermosetting resin layer as the reinforcing layer. In this case as well, the mold release agent layer 30 is formed between the main body portion 20 and the thermosetting resin layer that serves as the reinforcing layer, so when high pressure gas, for example, is filled into the high pressure tank manufactured in this way, from the gas pressure can be dispersed without locally concentrating at the liner.

Next, a fourth modified example will be described. In the example embodiment described above, a high pressure hydrogen tank that is filled with hydrogen is used as the high pressure tank, but a high pressure tank to be filled with any of a variety of substances, such as oxygen or liquid nitrogen, may also be employed.

The invention is not limited to the example embodiment or modified examples, but may be carried out in any of a variety of modes without departing from the scope thereof. The technical features of the example embodiment may be replaced or combined as appropriate to solve all or some of the aforementioned problems, or to achieve all or some of the aforementioned effects. Also, these technical features may be omitted as appropriate unless otherwise described in this specification as being absolutely necessary.

The invention may be applied to a variety of modes. For example, the invention may be applied to a high pressure gas tank, a high pressure tank manufacturing apparatus, a fuel cell vehicle, or a fuel cell system or the like.

What is claimed is:

1. A manufacturing method of a high pressure tank, comprising:
   forming a reinforcing layer on an outer surface of a liner; and
   performing an adhesion inhibiting treatment that inhibits adhesion of the liner to the reinforcing layer on at least a portion of a region where the liner contacts the reinforcing layer, before forming the reinforcing layer,
   wherein the at least the portion of the region is a dome portion which the liner includes, and
   wherein the dome portion includes a curved surface shape and is provided between the liner and the reinforcing layer so as to contact the reinforcing layer; and
   wherein specular finishing is applied to the outer surface of the liner, in the adhesion inhibiting treatment.

2. The manufacturing method of a high pressure tank according to claim 1, wherein the high pressure tank is a high pressure hydrogen tank that is configured to be filled with hydrogen.

3. The manufacturing method of a high pressure tank according to claim 1, further comprising a cap provided at an end of the liner and including a surface that is inhibited from adhering to the reinforcing layer and being provided between the cap and the reinforcing layer.

4. The manufacturing method of a high pressure tank according to claim 1, wherein the reinforcing layer is formed by directly winding fiber impregnated with a resin on the outer surface of the liner.

\* \* \* \* \*